March 6, 1934.    G. H. LUNEBURG    1,950,317
BOWDEN WIRE CLAMP
Filed May 20, 1933
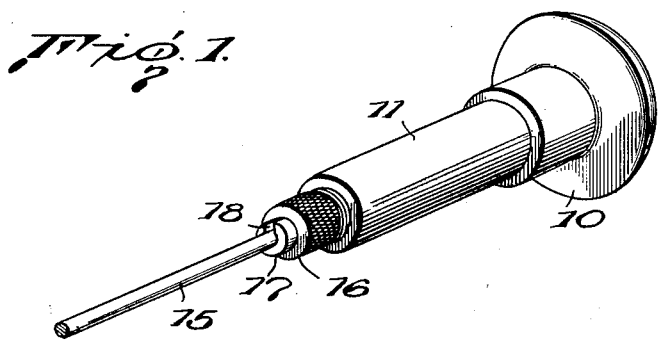
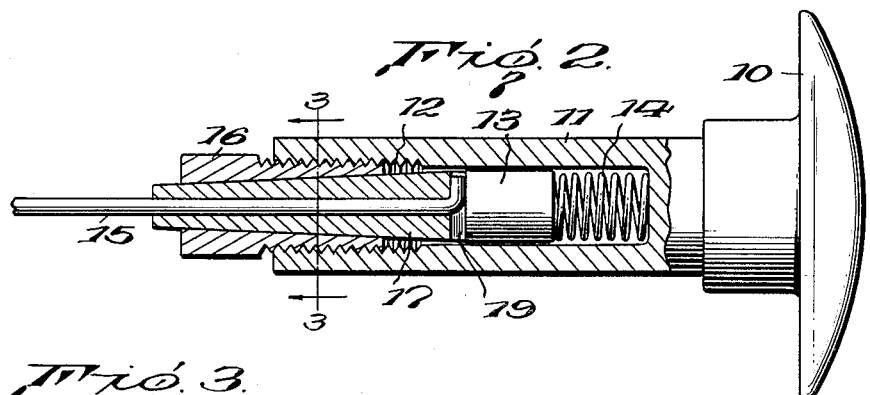
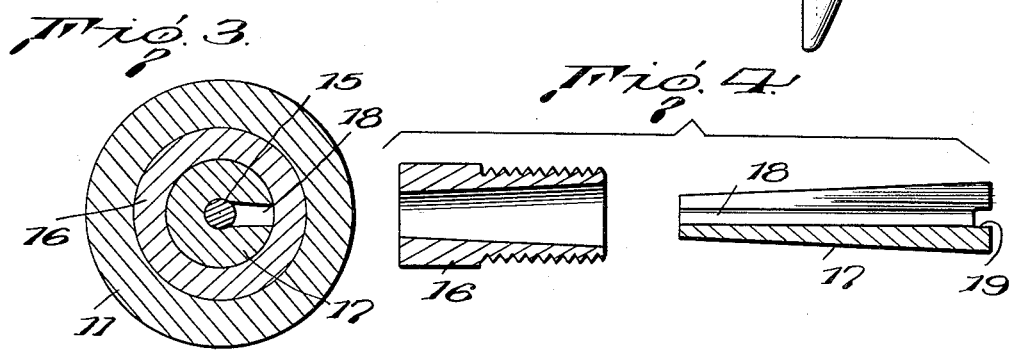
Inventor
Gustave H. Luneburg,
By Church & Church
His Attorneys Patented Mar. 6, 1934

1,950,317

UNITED STATES PATENT OFFICE 1,950,317

BOWDEN WIRE CLAMP

Gustave H. Luneburg, Amsterdam, N. Y.

Application May 20, 1933, Serial No. 672,080

3 Claims. (Cl. 287—20)

This invention relates to improvements in connecting devices for wires and, particularly, to a novel form of connection between a manipulating element, such as a button or handle, and a wire extending from said manipulating element to the device to be operated. More particularly, the invention relates to a connection between the connecting wire and the so-called button, for controlling the choke, spark, lights or the like of an automobile.

The object of the present invention is to provide an improved and simple arrangement for establishing the connection between such a wire and the knob or handle, whereby the use of solder or the like is eliminated. Such a connection facilitates repair, as it is only necessary to disassemble the connection and restore the parts to their assembled position.

More specifically, the invention contemplates an operating button in which telescoping, wedging elements are secured in such fashion that the relative movement of one of said wedging elements with respect to the other will securely bind or clamp one end of the length of wire therein.

In the accompanying drawing illustrating a preferred embodiment of the invention, Figure 1 is a perspective view of an operative button with a portion of the length of wire extending therefrom;

Fig. 2 is a side view, partly in section, illustrating the assembly of the several parts of the button and connection;

Fig. 3 is a transverse sectional view on the line 3—3 of Fig. 1;

Fig. 4 illustrates the two telescoping, wedging members in section, said members being disassembled; and Fig. 5 is a perspective view of the wedging member in which the end of the wire is held.

While the specific form of connection may be utilized at points other than the knob by which a mechanical device is to be controlled, such a knob is utilized for the purposes of illustrating the invention in the present instance. The knob 10, which may be the operating handle for the choke of an automobile, is formed with a hollow shank 11, threaded on its interior at 12. Positioned within the hollow shank is an abutment preferably in the form of a metallic block 13 yieldingly urged toward the open end of the shank by spring 14. This form of stop is preferred, as compared with the fixed stop, because it eliminates the necessity of providing an accurate fit of the several parts constituting the connection.

For clamping the end of the wire 15, there are two wedge members in the form of a sleeve 16, threaded into the button shank and a tapered plug or wedge 17 received in the conical bore of said sleeve. The plug, or what might be termed the anchoring member 17, is formed with a recess 18 extending longitudinally thereof, and a transverse recess 19. The end of the wire is adapted to be received in a longitudinal recess 18 and its extremity bent over into the transverse recess 19. For this reason the transverse recess 19 is preferably formed in the end face of the plug 17, although it will be apparent that this particular location is not essential.

It will also be observed, in Fig. 2, that the end of the plug or conical wedge member 17 projects beyond the inner end of sleeve 16, so that when the sleeve 16 is threaded into the shank of the button the protruding end of the wedge 17 will engage against the abutment 13. This causes a relative movement of the sleeve 16 and plug 17, the plug 17 being pressed or forced into the conical bore of the sleeve whereupon the wedging action imposed upon the plug will cause the latter to contract or be compressed. This results in the recess 18 being contracted, as illustrated in Fig. 3, whereby that portion of the wire extending longitudinally of the plug will be firmly clamped within the interior of the button shank. The recess 18 extends from the axis of the plug 17 to the periphery thereof. This not only facilitates placement of the end of the wire within the recess, but renders the plug compressible for the purpose of locking the end of the wire in place. The binding action also locks the sleeve against accidental rotation and consequent release of the wire.

From the foregoing, it will be apparent that, in case of breakage, the connection can readily be reestablished, simply by backing out the sleeve 16 and inserting the new wire to be connected in the plug 17. In other words, the use of solder and the like is entirely eliminated and the assembly is so simple as to require very little time in the repair of a broken connection.

What I claim is:

1. An attachment for installation upon a push-pull type control wire comprising: a body member provided with a cylindrical recess, a tubular sleeve member threadedly associated with said body member for telescopic adjustment therewithin, said sleeve member having an outwardly tapered bore, a tapered wedge member disposed within the bore of said sleeve member and having an external surface complementary to the tapered bore of said sleeve, said wedge member having an axial bore for reception of the control wire and a radial slot communicating with said wedge bore and within which slot the extreme end of the control wire, when angularly bent, is receivable, and an abutment within the cylindrical recess of said body member which abutment coacts with said sleeve member, when threaded up, to constrict the bore of said wedge and anchor the portions of said wire disposed in said wedge bore and slot against rotative as well as axial movement relative to said body member.

2. An attachment for installation upon a push-pull type control wire comprising; a body member provided with a cylindrical recess, a tubular sleeve member threadedly associated with said body member for telescopic adjustment therewithin, said sleeve member having an outwardly tapered bore, a tapered wedge member disposed within the bore of said sleeve member and having an external surface complementary to the tapered bore of said sleeve, said wedge member having an axial bore for reception of the control wire and a radial slot in its inner end, which slot communicates with said wedge bore to receive the end of the control wire when angularly bent, and an abutment within the cylindrical recess of said body member, which abutment engages the inner end of said wedge member when the sleeve member is threaded up, effecting constriction of the wedge bore and anchorage of said wire against rotative as well as axial movement relative to said body member.

3. An attachment for installation upon a push-pull type control wire comprising: a body member provided with a cylindrical recess, a tubular sleeve member threadedly associated with said body member for telescopic adjustment therewithin, said sleeve member having an outwardly tapered bore, a tapered wedge member disposed within the bore of said sleeve member and having an external surface complementary to the tapered bore of said sleeve, said wedge member having an axial bore for reception of the control wire and a radial slot in its inner end, which slot communicates with said wedge bore to receive the end of the control wire when angularly bent, and a spring-backed abutment within the cylindrical recess of said body member, which abutment firmly engages the inner end of said wedge member when the sleeve member is threaded up, effecting constriction of the wedge bore and anchorage of said wire against rotative as well as axial movement relative to said body member.

GUSTAVE H. LUNEBURG.